(12) United States Patent
Lu et al.

(10) Patent No.: US 10,229,494 B2
(45) Date of Patent: Mar. 12, 2019

(54) AUTOMATED ANALYSIS OF INTRAVASCULAR OCT IMAGE VOLUMES

(71) Applicant: CASE WESTERN RESERVE UNIVERSITY, Cleveland, OH (US)

(72) Inventors: Hong Lu, Somerville, MA (US); David L. Wilson, Cleveland Heights, OH (US); Hiram G. Bezerra, Cleveland, OH (US); Soumya Ray, Cleveland Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 29 days.

(21) Appl. No.: 15/273,405

(22) Filed: Sep. 22, 2016

(65) Prior Publication Data

US 2017/0169566 A1 Jun. 15, 2017

Related U.S. Application Data

(60) Provisional application No. 62/222,076, filed on Sep. 22, 2015.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4604* (2013.01); *G06K 9/52* (2013.01); *G06K 9/6215* (2013.01); *G06K 9/6218* (2013.01); *G06K 9/6269* (2013.01); *G06T 7/155* (2017.01); *G06T 7/62* (2017.01); *G06T 7/77* (2017.01); *G06K 2009/4666* (2013.01); *G06K 2209/051* (2013.01); *G06T 2207/10101* (2013.01); *G06T 2207/20072* (2013.01); *G06T 2207/20081* (2013.01); *G06T 2207/20092* (2013.01); *G06T 2207/30052* (2013.01); *G06T 2207/30101* (2013.01)

(58) Field of Classification Search
USPC .................................................. 382/128–134
See application file for complete search history.

(56) References Cited

U.S. PATENT DOCUMENTS

| | | | |
|---|---|---|---|
| 7,212,670 B1 * | 5/2007 | Rousselle ............ | G06K 9/0063 382/173 |
| 2008/0056572 A1 * | 3/2008 | Nielsen .................. | G06K 9/342 382/173 |
| 2012/0075638 A1 * | 3/2012 | Rollins .............. | A61B 1/00009 356/479 |

OTHER PUBLICATIONS

Ughi, et al. "Automatic assessment of stent neointimal coverage by intravascular optical coherence tomography", European Heart Journal—Cardiovascular Imaging (2014) 15, 195-200.

(Continued)

*Primary Examiner* — Alex Kok S Liew
(74) *Attorney, Agent, or Firm* — Tarolli, Sundheim, Covell & Tummino LLP (57) ABSTRACT

This disclosure provides systems and methods to automatically classify stent struts as covered or uncovered and to measure the thickness of tissue coverage. As one example, the method includes storing three-dimensional image data acquired intravascularly via an optical coherence tomography (OCT) apparatus and detecting struts based on analysis of the image data. Image data corresponding to each of the detected struts is further analyzed automatically to compute an indication of tissue coverage for the stent.

19 Claims, 9 Drawing Sheets

(51) Int. Cl.
  *G06K 9/52*   (2006.01)
  *G06K 9/46*   (2006.01)
  *G06K 9/62*   (2006.01)
  *G06T 7/77*   (2017.01)
  *G06T 7/155*  (2017.01)
  *G06T 7/62*   (2017.01)

(56)  References Cited

OTHER PUBLICATIONS

Lu, et al. "Automatic stent detection in intravascular OCT images using bagged decision trees", Nov. 1, 2012, vol. 3, No. 11, Biomedical Optics Express.

Wang, et al., "Semiautomatic segmentation and quantification of calcified plaques in intracoronary optical coherence tomography images", Journal of Biomedical Optics 15(6), 061711 (Nov./Dec. 2010).

Wang, et al., "Volumetric quantification of fibrous caps using intravascular optical coherence tomography", Jun. 1, 2012/vol. 3, No. 6, Biomedical Optics Express.

Attizzani, et al., "Contemporary assessment of stent strut coverage by OCT", Int J Cardiovasc Imaging (2013) 29:23-27.

Guagliumi, et al., "Examination of the in Vivo Mechanisms of Late Drug-Eluting Stent Thrombosis", JACC: Cardiovascular Interventions, vol. 5, 2012.

Guagliumi, et al., "Strut Coverage and Late Malapposition With Paclitaxel-Eluting Stents Compared With Bare Metal Stents in Acute Myocardial Infarction", http://circ.ahajournals.org/content/123/3/274.

Pfisterer, et al., "Late Clinical Events After Clopidogrel Discontinuation May Limit the Benefit of Drug-Eluting Stents", Journal of the American College of Cardiology, vol. 48, 2006.

Ong, et al., "Late Angiographic Stent Thrombosis (LAST) Events With Drug-Eluting Stents", Journal of the American College of Cardiology, vol. 45, 2005.

Joner, et al., "Pathology of Drug-Eluting Stents in Humans Delayed Healing and Late Thrombotic Risk", Journal of the American College of Cardiology, vol. 48, 2006.

Beijk, et al., "GenousTM endothelial progenitor cell capturing stent vs. The Taxus Liberte' stent in patients with de novo coronary lesions with a high-risk of coronary restenosis: a randomized, single-centre, pilot study", European Heart Journal (2010) 31, 1055-1064.

Granada, et al., "Development of a Novel Prohealing Stent Designed to Deliver Sirolimus From a Biodegradable Abluminal Matrix", http://circinterventions.ahajournals.org/content/3/3/257.

Matthias E. Pfisterer, MD, "Late Stent Thrombosis After Drug-Eluting Stent Implantation for Acute Myocardial Infarction A New Red Flag Is Raised", http://circ.ahajournals.org/content/118/11/1117.

* cited by examiner

AUTOMATED ANALYSIS OF INTRAVASCULAR OCT IMAGE VOLUMES

CROSS REFERENCE TO RELATED APPLICATION

This application claims the benefit of U.S. Provisional Patent Application No. 62/222,076, filed Sep. 22, 2015 for AUTOMATED STENT COVERAGE ANALYSIS IN INTRAVASCULAR OCT IMAGE VOLUMES, which is incorporated herein by reference in its entirety.

GOVERNMENT FUNDING

This invention was made with government support under Grant No. R01HL114406 awarded by The National Institutes of Health. The United States government has certain rights to the invention.

TECHNICAL FIELD

This disclosure relates to systems and methods for analysis of optical coherence tomography (OCT) images, such as intravascular (IV) OCT images of implanted objects such as stents.

BACKGROUND

Stent implantation via percutaneous coronary intervention (PCI) is a popular coronary revascularization procedure for patients with atherosclerosis. Various stent types have been designed to improve the efficacy of stent treatment. Extensive preclinical and clinical studies are needed to evaluate these newly developed stent designs. For example, every year, hundreds of thousands of patients with coronary artery diseases in the U.S. are treated with intra-vascular stents. Improper deployment of stents and resulting tissue responses are associated with stent thrombosis, which can be a life-threatening complication. Intravascular optical coherence tomography (IVOCT) is a catheter-based optical imaging technique and is able to image the depth-resolved 3-D profile of coronary arteries with high resolution. IVOCT has demonstrated significant advantages in strut coverage analysis due to better resolution and contrast compared to the alterative technology, intravascular ultrasound (IVUS).

With its resolution, contrast, and imaging speed, IVOCT has been used in in vivo assessment of fine lumen architectures and stent tissue coverage after stent implantation. Currently, IVOCT image analysis is primarily done manually, requiring 6-12 hours per stent. In addition, inter- and intra-observer variability is inevitable in manual analysis. Recent publications based on manual stent analysis suggest a need of improved stent analysis tools.

SUMMARY

As one example, a method may include storing, in non-transitory memory, three-dimensional image data acquired intravascularly via an optical coherence tomography (OCT) apparatus. The method also includes detecting, by one or more processor, struts of a stent based on analysis of the image data and extracting, by the processor, a set of image features for each of the detected struts based on the image data. The method also includes classifying, by the processor, each of the struts as one of covered or uncovered based on applying a trained classifier with respect to the extracted features. As a further example, the method may be embodied as instructions stored on one or more machine-readable media that are executable by one or more processors.

As another example, a system may include an intravascular optical coherency tomography (IVOCT) apparatus that provides image data acquired during movement of an OCT probe within a body lumen. The system can also include one or more non-transitory media that stores the image data and image analysis instructions and one or more processors to access the one or more non-transitory media and to execute the image analysis instructions. The image analysis instructions may include a strut detector to detect struts of a stent within the body lumen based on the image data. The instructions also include a feature extractor to generate a set of image features for each of the detected struts based on the image data. The instructions also include a strut classifier to classify each of the struts as one of covered or uncovered based on applying a trained classifier with respect to the extracted features for each of the detected struts.

DETAILED DESCRIPTION

Overview

This disclosure provides systems and methods for automated analysis of intravascular OCT (IVOCT) image volumes. The examples disclosed herein can utilize machine learning methods, such as support vector machine and/or mesh growing, to detect and analyze implanted objects such as vascular stents.

As a further example, Bagged Decision Trees may be trained on manually marked struts to identify true stent struts from a large number of candidate struts obtained by image processing techniques. Machine learning algorithms are applied to IVOCT image analysis. Systems and methods disclosed herein thus can determine the presence of tissue coverage on the surface of struts, i.e., classification of stent struts as covered, uncovered or malapposed (struts floating in the vessel lumen), such as based on strut image features and using one or more trained Support Vector Machine (SVM) classifier. In examples identifying covered struts, systems and methods disclosed herein measure the tissue coverage thickness by calculating the distance from strut center to its closest point on the lumen boundary. In other examples, the closest-point method may calculate a tissue thickness measurement by measuring the distance along the A-line between the strut and catheter or from the strut to lumen center. The accuracy of such closest-point methods will be most evident when the OCT catheter is eccentric or the lumen is elliptical.

As yet a further example, systems and methods may be employed to detect stent struts and lumen boundary. For example, a set of image features are extracted from multiple pixel patches around each stent strut. A support vector machine (SVM) classifier is trained, such as using manually marked images for identifying covered and uncovered struts. Malapposed struts also can be identified when the distance to lumen boundary of uncovered struts exceeds the physical thickness of the strut. Additionally or alternatively, a graph-based Mesh Growing algorithm may be used to identify clusters of uncovered struts. Multiple statistics, e.g. area and percentage of uncovered struts, can be calculated on each identified cluster.

As disclosed herein, the systems and methods may include software (machine readable instructions), which when executed by one or more processor, performs automated stent analysis, result reporting, manual review, and editing. Using the systems and methods disclosed herein, analyst time for a full stent analysis can be significantly reduced to about 0.5-1 hour from 16 hours. In addition, the systems and methods disclosed herein will also increase the reproducibility of stent studies.

Systems and methods disclosed also may provide an accurate method for segmenting the lumen and identification of the strut front surface to enable accurate measurement of covering tissue. This includes local lumen segmentation and identification of the strut front surface by identifying the peak signal in the strut blooming artifact in IVOCT images.

Description of Example Embodiments

Figure 1:
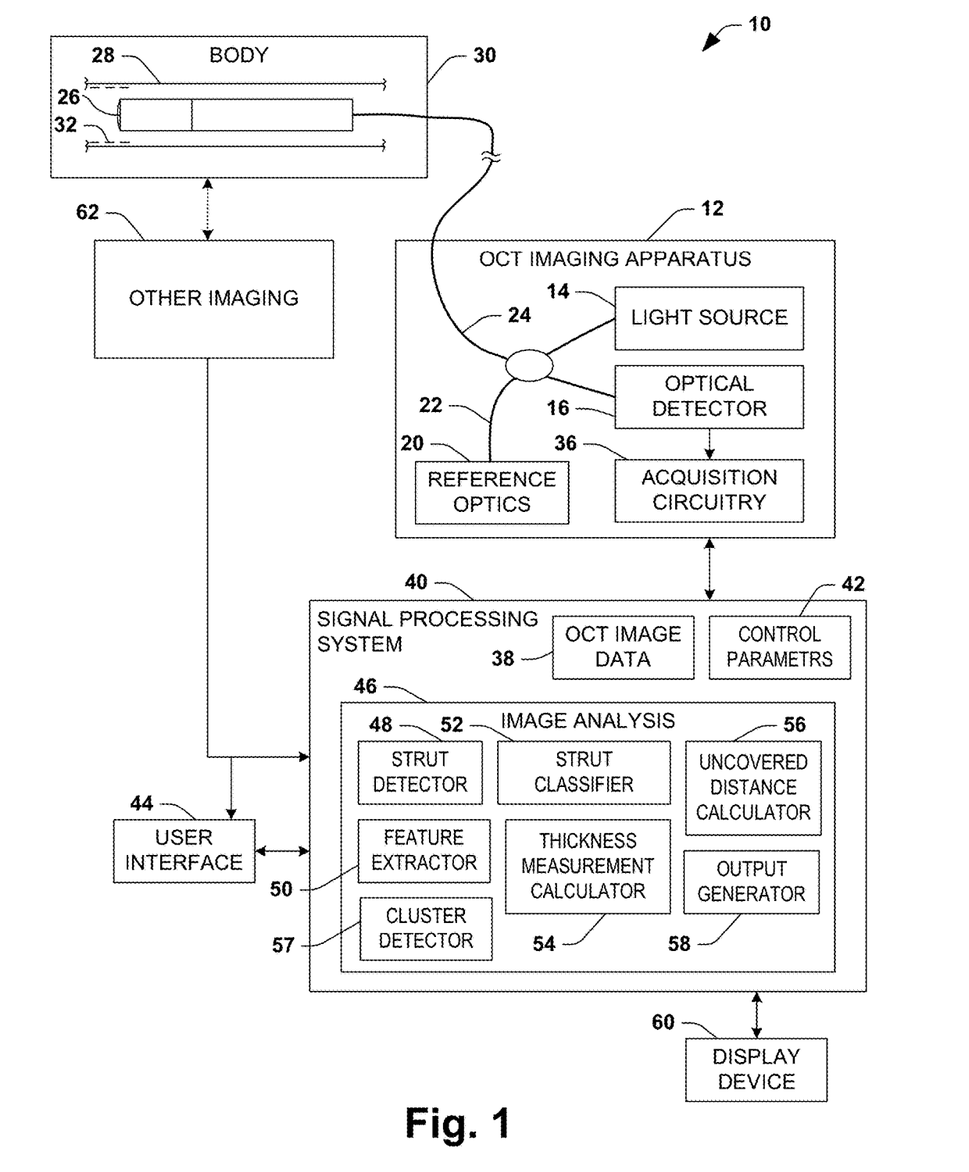
FIG. 1 is a block diagram illustrating an example of an optical coherence tomography system for analysis, visualization and characterization of implanted objects.

FIG. 1 depicts an example of an optical coherence tomography system 10 for analysis, visualization and characterization of implanted objects, such as intravascular stents. The system 10 includes an IVOCT imaging apparatus 12. The IVOCT imaging apparatus 12 can be implemented according to a variety of different platforms, including time-domain optical coherence tomography (TD-OCT) or frequency-domain optical coherence tomography (FD-OCT). Some examples of FD-OCT include spectral domain OCT (also known as spatially encoded frequency domain OCT) and swept source OCT (also known as time encoded frequency domain OCT). These OCT systems use a reference arm and an interferometer to detect echo time delays of light. The interferometer uses a beam splitter, dividing the light into a measurement arm (tissue sample) and a reference arm. The reference arm in TD-OCT is mechanically scanned (e.g., by a moving mirror longitudinally in time) to produce a time-varying time delay. In the FD-OCT, because the light source is frequency swept, the interference of the two light beams (tissue and reference) oscillates according to the frequency difference. Additionally, in FD-OCT the broadband interference is acquired with spectrally separated detectors (e.g., by encoding the optical frequency in time with a spectrally scanning source or with a dispersive detector, like a grating and a linear detector array) and depth scan can be immediately calculated by Fourier transform from the acquired spectra in the image without moving the reference arm. Thus, since all echo delays are acquired simultaneously, significant increases in the speed of image acquisition can be realized. In both TD and FD types of OCT systems the interference of the signal ultimately provides amplitude and frequency data.

With reference to FIG. 1, regardless of the type of OCT platform, the IVOCT imaging apparatus 12 includes a light source 14 and a detector 16 coupled to a beam splitter 18 via corresponding optical fibers or other waveguides. A reference arm 22 implements corresponding reference optics 20 that are coupled to the beam splitter via an optical fiber. A sample arm 24 employs a corresponding IVOCT probe 26 that is coupled to the beam splitter via an optical fiber to acquire optical signals. As an example, the probe 26 can be inserted into a patient's body 30, such as positioned within a vascular lumen 28, for acquiring IVOCT images of the inside of the lumen. Of particular interest, the acquired images can include an implanted object 32, such as a stent, positioned within the lumen 28.

As disclosed herein, the IVOCT imaging apparatus 12 can acquire OCT images before, during and/or after deployment of the stent 32 within the vessel lumen 28. For instance, the OCT images can be analyzed and generate feedback during deployment of the stent 32, such as by inserting the probe concurrently with the catheter apparatus used for stent placement and deployment. In other examples, the probe 26 can be inserted within the lumen separately from the implantation process to acquire OCT images of the stent implantation.

As one example, the IVOCT apparatus 12 can be a Fourier-Domain OCT (FD-OCT) system, such as the C7-XRTM OCT Intravascular Imaging System, available from St. Jude Medical, Westford, Mass. The system may use a tunable laser light source sweeping from 1250 nm to 1370 nm, providing 15-µm resolution along the A-line and 20-40 µm lateral resolution. Pullback speed may be approximately 20 mm/sec over a distance of 54.2 mm, and frame interval is 200 µm, in which the number of frames with stent present depends upon the length of the stent. Each polar-coordinate (r, θ) image may consist of 504 A-lines, 970 pixels along the A-line.

Various probe designs can be used to acquire the optical signals within the lumen 28. The probe 26 can include rotating optics or the probe itself can be rotatable about its longitudinal central axis for acquiring images as it rotates about its axis. The rotation can be automatic and controlled (e.g., in response to activation of a motor) or, in other examples, the rotation of the probe 26 about its longitudinal axis can be implemented manually. In addition to rotational motion of the probe 26 the probe itself can be moved at different speed along the axial direction within the lumen 28. Again, the advancement or pullback of the probe can be manually implemented, such as along a guide wire that has been placed within the lumen 28. As an example, the probe 26 can be pulled back axially at a pullback speed sufficient to acquire a series of images along the lumen inner wall, which is at least co-extensive with the axial position where the stent structure 32 resides.

As mentioned, the IVOCT imaging apparatus 12 can be implemented as a time-domain OCT system, a spectrum-domain OCT system or a swept source OCT system. Thus the components of the OCT imagining apparatus 12, including the light source 14, reference optics 20 and corresponding acquisition circuitry 36 are configured according to the type of OCT system being implemented. The acquisition circuitry 36 can include an arrangement of one or more amplifiers and an analog digital converter for providing OCT image data 38 that can be sampled over a period of time (e.g., in response to a sample clock—not shown) and stored in memory (e.g., a non-transitory machine readable medium).

The OCT image data 38 is processed by a corresponding signal processing system 40. The signal processing system 40 can also implement controls associated with the OCT imaging apparatus 12 such as controlling location and/or movement of the probe 26 within the lumen 28. For example, the controls can set one or more control parameters 42 for controlling various parameters of the OCT imaging apparatus 12, such as including parameters of the light source 14 (e.g., wavelength, power, etc.) and/or the detector 16 (e.g., detection acquisition rate used for acquiring for the OCT imaging 38). The control parameters 42 and resulting images can be further controlled in response to the user input via a user interface 44. For example, the user interface 44 can synchronize the image capture process with deployment of the stent or otherwise trigger OCT image acquisition in response to a user input during movement of the probe 26.

Figure 2:
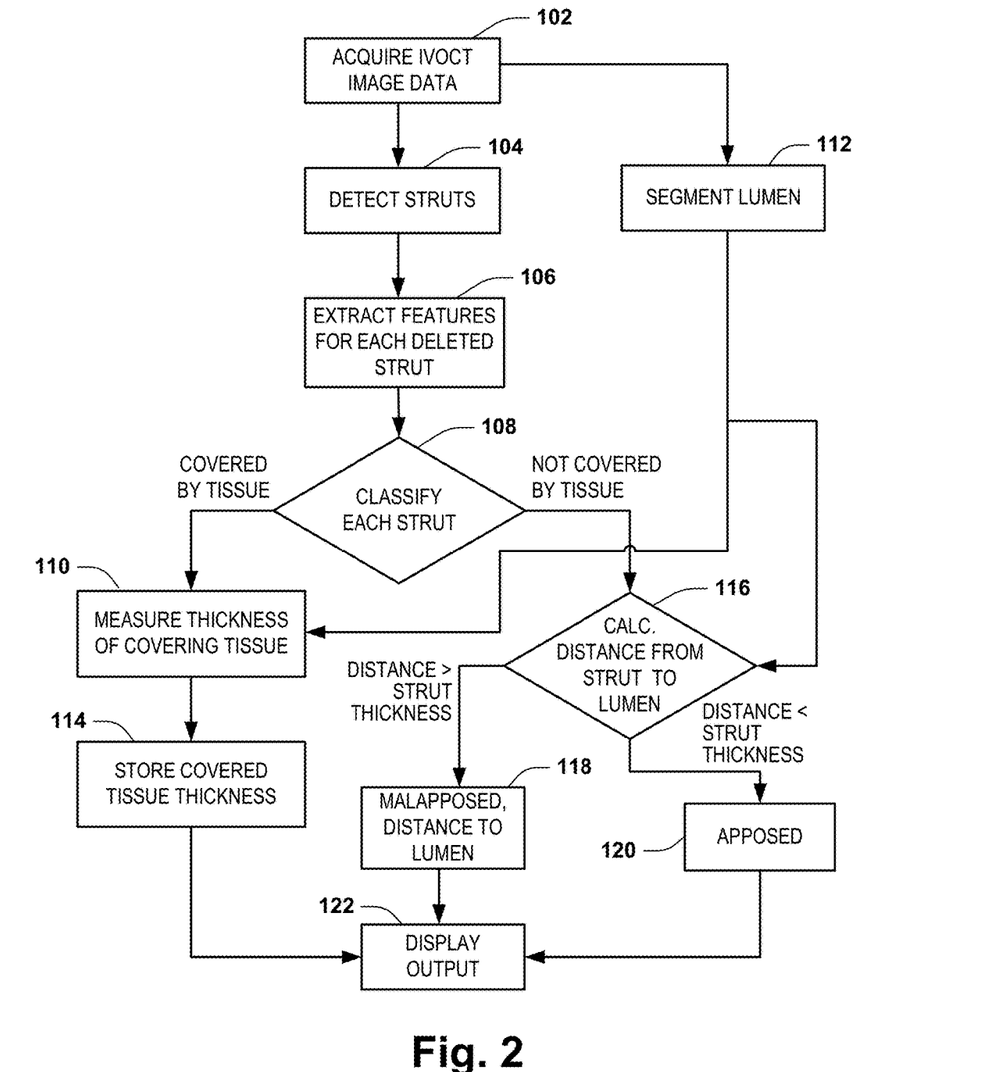
FIG. 2 is a flow diagram illustrating an example of an automated stent analysis method.

The signal processing system 40 also includes image analysis 46. The image analysis method 46 is programmed to analyze the OCT image data 38 acquired via the OCT imaging apparatus 12. For example, the OCT image data 38 corresponds to a plurality of sequential image frames acquired by the OCT imaging apparatus 12 as the probe 26 within the lumen 28 is moved. For example, the probe 26 can be advanced axially to a desired position beyond the distal axial end of the stent 32 and then pulled back axially at a controlled speed. The OCT image data 38 thus can include an OCT image set of a plurality of frames corresponding to the pull back of the probe 26 axially within the lumen 28 from a point axially beyond the distal end stent 32 to an axial position that passes by the opposite axial end of the stent. The OCT image data 38 can include a single pullback event or it can encompass multiple pullback events with different operating parameters for the OCT imaging system. FIG. 2, which his described below, demonstrates another example method that can be employed by the signal processing 40, including the image analysis 46.

The image analysis 46 can include a strut detector 48 to identify struts based on the image data 38, such as in a three dimensional image space corresponding to the image data. For example, the strut detector 48 of the image analysis 46 is programmed to detect candidate struts using morphological algorithms and extracted image features the candidates. For instance, the strut detector 48 employs evaluates pixels within a certain distance around the detected lumen boundary and identifies struts based on the intensity of such pixels (e.g., initially detecting the presence of a strut and marking its brightest pixel). To detect lumen boundary, in polar (r, θ) coordinates, edges are detected along r and then used dynamic programming to find the lumen contour having the highest cumulative edge strength from top to bottom along θ. As a further example, a bagged decision trees classifier can be trained in advance with manually labeled images to identify true stent struts from the candidate struts that have been identified. Further examples of methods that can be implemented by the strut detector 48 to detect a stent, struts thereof, lumen body or other intracorporeal structures using IVOCT image processing are disclosed in U.S. patent application Ser. No. 15/007,769, filed Jan. 27, 2016, and entitled ANALYSIS OF OPTICAL TOMOGRAPHY (OCT) IMAGES, which is incorporated herein by reference.

The image analysis 46 also includes a feature extractor 50 to extract a number of features for each identified struts by the strut detector 48. The features can correspond to set of features associated with pixel patches generated for each detected strut, such as disclosed herein. The feature extractor 50 thus determines image features for each of the pixel patches positioned adjacent each detected strut. For example, the feature extractor 50 can determine image features that includes intensity values for pixels in each pixel patch, which may include individual values or relative values among two or more pixel patches. The feature extractor 50 may also compute distance values among selected pairs of pixel patches. Different features may be computed for different types of pixel patches associated with each detected strut.

Figure 3:
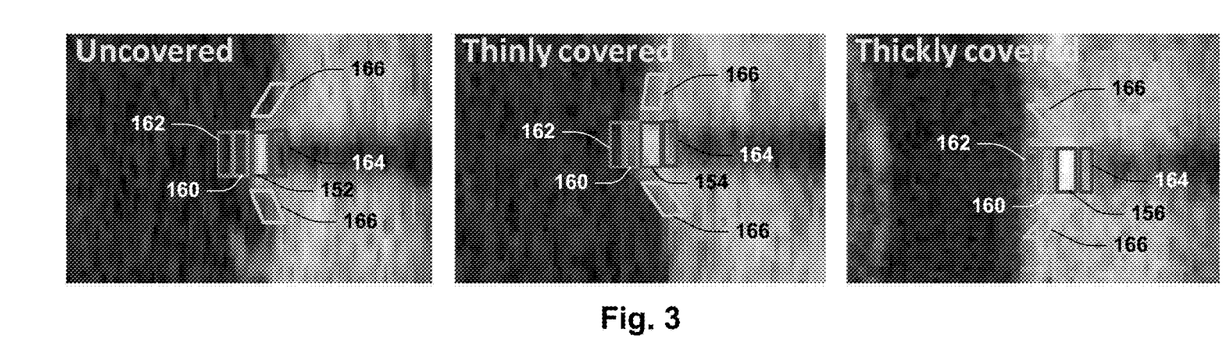
FIG. 3 illustrates examples of pixel patches for feature extraction in various struts.

By way of illustration, FIG. 3 depicts examples of pixel patches to enable feature extraction in struts having differing amounts of tissue coverage, namely, an uncovered strut, thinly covered strut and thickly covered strut. The feature extractor 50 extracts image features from a plurality of pixel patches disposed around the strut, such as shown in FIG. 3. In each example, a plurality of pixel patches are generated from the image data adjacent to a pixel patch corresponding to each strut 152, 154 and 156, demonstrated as including middle patch 160, front patch 162, and back patch 164. The pixel patches 160, 162, and 164 are used to capture intensity features and distance features in a radial direction (with respect to the lumen axis). Side patches 166 are also employed capture the tissue continuity features in angular direction with respect to each strut 152, 154 and 156. Other numbers and arrangements of patches may be used in other examples.

Figure 4:
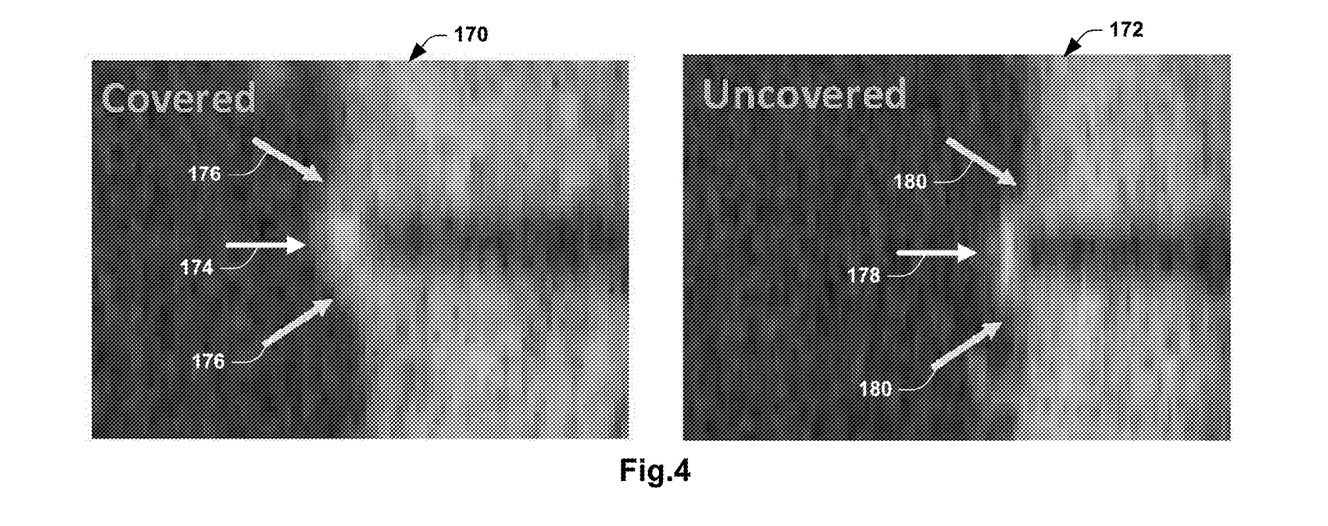
FIG. 4 illustrates examples of covered and uncovered struts.

Table 1 demonstrates an example embodiment features that the feature extractor 50 may extract from IVOCT image data, which features may be utilized (e.g., by classifier 52) to perform strut classification, as disclosed herein. The features in Table 1 may be derived from manual criteria for strut classification. FIG. 4 illustrates example images of a covered strut 170 and an uncovered strut 172. For the covered strut 170, there is a layer of smooth and homogeneous tissue on top of the strut (arrow 174) and the strut-tissue boundary in the angular direction is continuous and smooth (arrows 176). As demonstrated at 172, uncovered struts do not satisfy one or both of these criteria. The uncovered strut 172 lacks tissue coverage on top of it (arrow 178) or at strut-tissue boundary in angular direction (arrows 180).

TABLE 1

Example Features for strut Classification

| | | | | | |
|---|---|---|---|---|---|
| Center Patches | 1. Mean Intensity of strut patch | 2. Mean Intensity of middle patch | 3. Mean Intensity of front patch | 4. Intensity difference between strut and middle patches | |
| | 5. Intensity difference between middle and front patches | 6. Intensity difference between middle patch and back patch | 7. Distance from strut center to original lumen boundary | 8. difference from center to refined lumen boundary | 9. Front edge sharpness of lumen boundary |
| Side patches | 10 & 11 Percentage of dark pixels | 12 & 13 Mean Intensity | 14 & 15 Median intensity | 16 & 17 Standard deviation of intensity | 18 & 19 Horizontal top-bottom distance | 20 & 21 Slope of lumen boundary |

By way of example, to examine the presence of tissue coverage on top of the strut, the feature extractor 50 is programmed to calculate features capturing the intensity and intensity change characteristics along A-lines containing the strut. In IVOCT images, light is reflected by the strut surface and the image of the strut (strut bloom) can be considered as the convolution of the strut surface and system point spread function (PSF.) Based on this physical principle, along the strut A-lines, feature extractor is programmed to define a multi-pixel wide (e.g., 3 pixels wide) patch centered at the brightest pixels as the strut patch (FIG. 3, patch 152, 154, 156). The 5-pixel width is chosen based on observing a large number of struts. Other pixel widths may be used in other examples, such as may vary depending on the IVOCT system configuration and probe. The height of the strut patch is determined by the height of the shadow detected in the strut detection step. On the luminal side of the strut patch, feature extractor constructs serially extract two 2-pixel wide patches: middle patch and front patch (FIG. 3, patches 160 and 162).

In Table 1, features 1-5 are the mean intensity of the strut patch, mean of the middle patch, mean of the front patch, intensity difference between the strut patch and the middle patch, difference between the middle patch and the front patch. The combination of these features is able to handle most of the variations in tissue thickness, strut bloom width and brightness. For covered struts, the strut bloom tends to be asymmetric because the front surface has tissue while the back surface does not. Therefore, the intensity difference between the middle patch and back patch (feature 6) is also an informative feature.

The distance from the strut center to lumen boundary (feature 7) is a useful feature. Uncovered struts usually lie on the luminal side of the lumen boundary and covered struts tend to appear on the abluminal side. For example, uncovered struts floating in the lumen (malapposed struts) and struts with thick tissue coverage are on opposite sides of the lumen boundary and their distances to lumen boundary have different signs. However, this feature is not very effective in distinguishing thinly covered struts and uncovered, apposed struts, as the lumen boundary is always detected on the luminal side for both. So, the image analysis is adapted to refine the lumen boundary, such as by interpolating the boundary locations at two ends of the strut to replace the original boundary. The distance from strut to the originally detected lumen boundary (feature 7) and the distance to the refined lumen boundary (feature 8) are both found to be useful in combination. The front edge sharpness (feature 9) is the intensity gradient along the original lumen boundary in the strut A-lines. If the strut is uncovered, this edge tends to be sharper than covered struts, because it is the direct transition from lumen to strut.

To capture the tissue continuity feature at the strut-tissue boundary in angular direction, feature extractor 50 is also programmed to extract a side pixel patch at each end of the strut (FIG. 3, patches 166). The orientation of the lumen boundary relative to the A-line direction can introduce errors in side patch extraction. To reduce this effect, feature extractor 50 extracts side patches along the direction from lumen boundary to the strut front surface. The feature extractor 50 computes mean, median intensity, and intensity variation of these two side patches are computed (features 12-17). The percentage of pixels with intensity similar to the background is another useful feature (features 10 and 11). For example, uncovered struts are closer to the lumen and their side patches have more dark pixels. Feature extractor further can utilize features characterizing a horizontal distance between the top and bottom ends of the side patches (features 18 and 19) and the orientation of the lumen boundary (features 20 and 21), which features may have some influence on the side patch intensity features.

A strut classifier 52 employs the extracted features for each of the structures for classifying each strut, such as disclosed herein. The strut classifier 52 can classify each detected strut as covered or uncovered based on evaluation of the features extracted for each respective strut. As disclosed herein, additional automated image analysis 46 that is performed with strut can vary depending on the strut classification determined by the strut classifier 52.

By way of example, the strut classifier 52 may implement a support vector machine (SVM) that has been trained to classify strut characteristics based on a set of extracted features (e.g., features of Table 1). The SVM strut classifier 52 provides a linear classifier with maximum margin. The margin is the combined distance from the linear decision surface to the nearest data point(s) on either side. Maximizing the margin can help reduce overfitting and improve generalization. SVM handles non-separable data by adding a slack variable, $\zeta_i$, to the objective function to allow certain amount of misclassification, i.e., soft-margin SVM. The soft-margin SVM algorithm solves the constrained minimization problem in equation (1).

$$\operatorname{argmin}_{w, \zeta_i} \tfrac{1}{2}\|w\|^2 + C\Sigma\zeta_i = 1, y_i(wT\phi(x_i)+b) \geq 1-\zeta_i \text{ and } \zeta_i \geq 0 \quad (1)$$

where w is a vector normal to the decision boundary and $\tfrac{1}{2}\|w\|^2$ is inversely proportional to the margin width, C is a positive parameter that controls the trade-off between the slack variable penalty and the margin width,
yi is the true label,
ϕ(xi) is the transformed feature vector, and
b is the bias parameter.

SVM can produce a decision boundary nonlinear in the input. In Eq (1), this is indicated with ϕ(xi), where xi is the original input. However, instead of mapping the input explicitly using a function ϕ, a "kernel trick" can be used. For example, a kernel matrix K(xi, xj)=ϕ(xi)·ϕ(xj) can be defined. Intuitively, the kernel matrix measures the similarity between the transformed feature vectors. In fact, it can be shown that any kernel matrix that satisfies Mercer's conditions corresponds to some feature map ϕ. Further, the decision boundary can be expressed in terms of the kernel matrix. Thus, the feature map ϕ does not need to be explicitly considered. This "trick" has great computational advantages: certain kernel matrices, such as the radial basis function (RBF) kernel, correspond to an underlying infinite dimensional mapping function ϕ. Yet the matrices themselves can be computed in polynomial time and can express a complex decision boundary. Various kernel functions, e.g., polynomial, radial basis function (RBF), and hyperbolic tangent, allow SVM to learn complex relationships, including relationships among features disclosed herein. RBF kernel in equation (2) was selected via a trial-and-error experiment.

$$\kappa(xi, xj, \sigma) = \exp\frac{(xi - xj)}{2\sigma^2} \quad (2)$$

where xi and xj are the feature vectors, and
a controls the width of the Gaussian function.

Figure 5A:
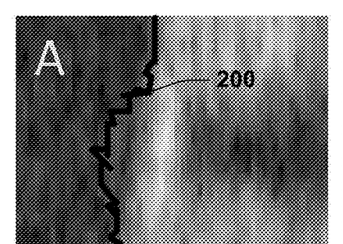
FIGS. 5A-D illustrate examples of strut-level tissue coverage thickness measurement in which: 5A depicts an example global lumen; 5B depicts an example lumen boundary in strut region that has been corrected; 5C depicts tissue thickness that is being measured; and 5D depicts an example measurement for strut to lumen distance.
Figures 5A, 5B:
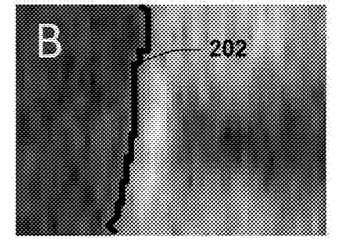

The image analysis 46 also includes a thickness measurement calculator programmed to compute the thickness of tissue coverage for each covered strut, as classified by classifier 52. For example, a precise lumen boundary will enable accurate tissue coverage thickness. The width of the edge kernel for calculating the gradient map and the connectivity constraint in dynamic programming (DP) were set to relatively large values to capture the global lumen boundary in a cross section. However, these parameters may provide inaccurate boundaries in the presence of struts, as shown boundary 200 in FIG. 5A. To correct this phenomenon, image analysis 46 processes a local region corresponding to shadow width plus a plurality of A-lines on either side. A local gradient map is calculated using a smaller kernel width. The first point from the global results is given a high gradient value that helps to ensure a solution connecting to the global lumen boundary. A local lumen boundary is then detected using dynamic programming with a tighter connectivity constraint, such as boundary 202 shown in FIG. 5B.

Figures 5A, 5C:
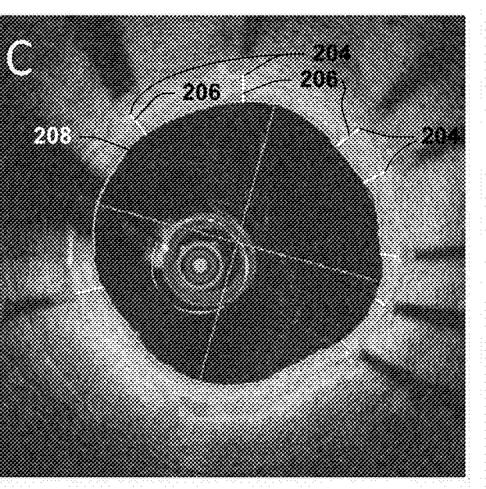

For struts 204 classified as covered and thus residing within tissue, such as shown in FIG. 5C, the thickness measurement calculator 54 computes tissue coverage thickness as the distance 206 from previously detected strut center to its closest-distance point on the local lumen boundary 208.

Figures 5A, 5D:
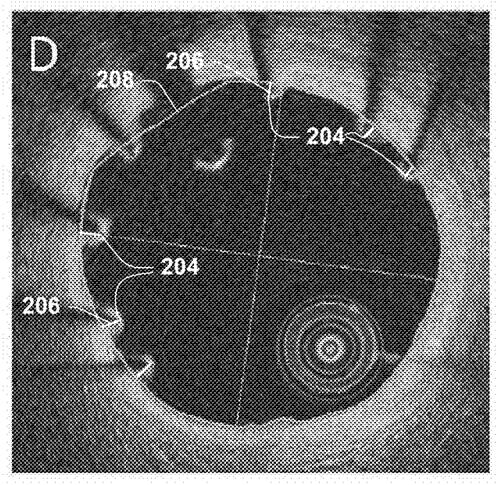

For struts 204 classified as uncovered by classifier 52 and thus residing radially inwardly with respect to the lumen boundary, image analysis 46 also includes a distance calculator 56 programmed to compute a measurement of strut to lumen distance 206. As demonstrated in FIG. 5D, the distance calculator 56 may compute the distance 206 from the detected strut center (within the lumen boundary) to its closest distance point on the lumen boundary 208. In some examples, each of the thickness measurement calculator 54 and distance measurement calculator 56 implement the same types of calculations, but on differently classified struts, which provides different meaning to the measured distance values.

In some examples, the image analysis 46 is programmed to select from a plurality of different distance calculation methods. For example, each calculator 54, 56 may include multiple different calculators or be configurable by the image analysis based on the geometry of the catheter and/or the lumen. The geometry of the catheter and/or the lumen may be determined from the image data 38, control parameters 42 and/or user input via user interface 44. As an example, the distance calculator 54 may compute the coverage thickness by calculating a distance along the A-line between the strut and catheter or by calculating a distance along the A-line from the strut to lumen center, which is selected by the image analysis 46 as described.

As a further example, the image analysis 46 includes a cluster detector 57 that is programmed to detect clusters of uncovered struts. For example, the cluster detector 57 can implement a graph-based Mesh Growing algorithm to detect clusters of uncovered struts. For each polar coordinate image, strut locations are projected onto a line as a function of angles. All projected lines of stent frames are displayed as a function of frame number to form a 2D image. In this 2D image, the mesh growing each cluster is initialized with a seed point of an uncovered strut. The current cluster is grown by checking four $A_s \times Z_s$ (for the sizes along vessel wall and z, respectively) neighborhoods of the seed point in four directions (NE, SE, SW, and NW quadrants). In each neighborhood, all uncovered struts are added to the current cluster. The most distant uncovered strut in this neighborhood is added as a new seed point for the current cluster. The current cluster is kept growing until no more seed point for this cluster is available. Then a new cluster is started with an uncovered strut not assigned to any cluster yet. The cluster detector terminates the mesh growing algorithm when all the uncovered struts get a cluster membership. As one example, the neighborhood size may be set as $A_s$=1 mm, $Z_s$=1 mm, although other sizes could be utilized in other examples.

By way of further example, the following table demonstrates pseudo code that may be implemented by the cluster detector 57 to perform the Mesh Growing algorithm to detect clusters of uncovered struts.

| Example_Pseudo code of Mesh Growing algorithm |
| --- |
| While not all uncovered struts have a cluster membership |
| Start a new cluster with an uncovered strut without any cluster membership |
| While there is seed point available for the current cluster |
| Randomly pick a seed point |
| for each of the 4 neighborhoods (NE, SE, SW, NW) of the seed point |
| Add the uncovered struts in the neighborhood to the current cluster |
| Add the uncovered strut most distant to the seed point as a new seed point for the current cluster |
| end |
| end |
| end |

The corresponding measurements and computed values for each of the struts can be stored in memory, such as associated with the image data corresponding to metadata describing the measurements and other information determined from the OCT image data 38. For instance, image data and 3D locations where such measurements have been made can be tagged or otherwise linked to the respective measurements. In this way, subsequent analysis of the image data can provide an indication of the measurements that have been computed by the measurement calculators 54 and 56 for respective locations where such information was determined. User annotations can also be added via the user interface to the image data (e.g., as metadata).

The signal processing system 40 can also include an output generator 58 to generate a graphical output that can be presented via a display device 60. The output generator 58 can provide images in real-time during the procedure in which the probe 26 is moved within the lumen 28. In other examples, the output generator 58 can perform image processing on a plurality of image frames that have been acquired and stored as the image data 38 that have been process to identify strut locations and, in turn, visualize a three-dimensional graphical representation of the stent structure 32 and the lumen 28. The particular type of image, such as a real-time image acquired by the OCT imaging apparatus 12 or a composite image generated by the output generator 58 from a plurality of frames acquired during pull back of the OCT probe, can be determined based upon a user input entered via the user interface 44.

In some examples, as disclosed herein, the output generator 58 can superimpose the identified strut locations that have been determined to provide a graphical representation of such struts with respect to image data acquired by one or more other image modalities (e.g., fluoroscopy, magnetic resonance imaging (MRI), intravascular ultrasound or the like). For instance the OCT image can be co-registered with the image acquired by the other imaging modality to provide a composite image. The OCT imaging thus provides a high resolution 3-D image of the stent and the interior of the lumen 28, which resolution exceeds that available from the other imaging modality.

Additionally, it is understood that while the image analysis 46 can be utilized from image data acquired at any axial position within the lumen 28, the corresponding image data 38 further can correspond to images acquired during one or more OCT pullbacks in which the probe 26 is axially pulled back within the lumen 28 so that the acquired images include the entire axial length of the stent structure 32.

By utilizing the OCT imaging system intraprocedurally, real-time feedback can also be provided during the positioning and, ultimately, deployment of the stent 32. The images displayed on the display device 60 thus can provide visual feedback to enable a user to implement corrective action to mitigate malapposition, such as re-deployment (e.g., via balloon catheter) or other position adjustments to ensure proper contact between the stent struts 32 and the lumen wall 28. Additionally or alternatively, images displayed on the display device 60 thus can provide visual feedback post-implantation of the stent 32. For instance, post implantation, the OCT imaging system can acquire OCT images of an employment stent to provide feedback and associated quantitative metrics, such as stent area strut coverage in an automated manner, which can be used to identify potential issues that may require corrective action (e.g., excision or repositioning).

FIG. 2 is a flow diagram demonstrating an example method 100 that can be employed to analyze OCT image data (e.g., image data 38) to classify covered versus uncovered struts, measure tissue thickness of covered struts, and determine clusters of uncovered struts. The method 100 can be implemented as machine-readable instructions executed by a processor, such as corresponding to the image analysis method 46 disclosed herein. Thus, additional context of the system and image data acquisition and image analysis method that can be utilized can be had with reference back to the system of FIG. 1. The method begins at 102 as OCT image data is acquired (e.g., from an IVOCT imaging apparatus 12). The input image data can be acquired at 102 by any one or more configurations of IVOCT platform disclosed herein (e.g., time-domain OCT system, a spectrum-domain OCT system or a swept source OCT system). The image data input at 102 can be real time image data acquired and processed intraprocedurally or previously acquired data can be stored and later accessed following a procedure for performing the method 100.

At 104, struts are detected (e.g., by strut detector 48) based on the acquired image data. For example, the struts can be detected at 104 based on morphological algorithms and extracted image features for the candidate struts. For example, machine learning techniques can be utilized such as by implementing a bagged decision tree classifier that is trained in advanced with manually labeled images to identify true struts from the set of candidates. Other techniques can be utilized to detect struts at 104 such as those disclosed in the above-incorporated application.

At 106, image features are extracted (e.g., by feature extractor 50) for each strut that is detected at 104. For example, the image features can include pixel values (e.g., intensity) and/or distance measurements for an arrangement of pixel patches, such as disclosed herein. The extracted features can be stored in memory associated with each strut position in the image data.

At 108, each detected strut is classified (e.g., by strut classifier 52) such as by using a previously trained machine learning classifier. For example, the classifying at 108 can be implemented via a support vector machine (SVM), such as disclosed herein. Based on the extracted features the classifier can classify a given strut as by either covered by tissue or not covered by tissue.

At 110, for each strut that is classified as being covered by tissue, at 110, the thickness of the covering tissue is measured (e.g., by fitness measurement calculator 54). The measurement at 110 also is based on the segmented lumen data, as the thickness is measured as a distance between a center of the detected strut and the lumen boundary. At 112, the lumen is segmented from the acquired image data (at 102). The segmented lumen data thus provides a set of pixels that define the lumen boundary, which is used to enable the measurement at 110. The resulting thickness of the covering tissue is stored in memory at 114 for each strut. The tissue thickness can be ascertained on a per pixel basis that is converted into measurement unit such as micrometers according to the pixel size and resolution of the acquired image data (acquired at 102).

For each strut that is classified as being not covered by tissue, at 116, a distance from the strut to the lumen can be calculated based on the segmented lumen data adjacent to each strut, such as disclosed herein. The distance from the strut to the lumen further is compared with respect to the strut thickness to ascertain and characterize an apposition associated with each respective strut. For example, based on the distance calculation at 116 (e.g., by distance calculator 56), if the distance exceeds the strut thickness the method proceeds to 118 in which the strut is categorized as malapposed based on the distance to lumen. If the calculated distance at 116 is less than the strut thickness, the method proceeds from 116 to 120 in which the strut is characterized as by apposed. The malapposed or apposed characterization can be stored in memory associated with each respective strut.

At 122, the corresponding results of the method 100 can be output (e.g., by output generator 58) and displayed on a display device (e.g., device 60). The output display may be an interactive display to vary the position and viewing angle based on the acquired IVOCT image data. As a further example, the covered tissue thickness distance to lumen and other characteristics associated with the detected struts can be superimposed on the display of another acquired image data as part of the output that is displayed at 122. Other imaging can be obtained through fluoroscopy, ultrasound, MRI or other image modality.

Example Results

The following provide results from application of the systems and methods disclosed herein to demonstrate the efficacy thereof in various scenarios.

Covered vs. Uncovered Strut Classification

Figure 6:
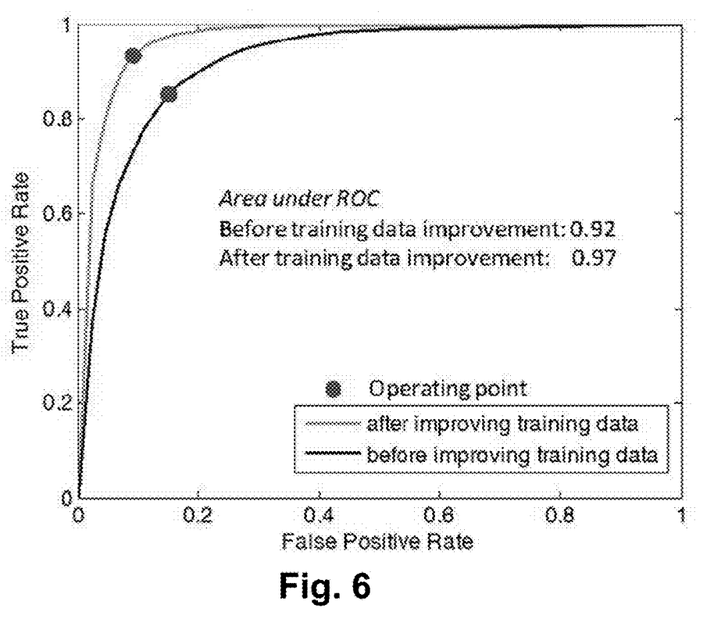
FIG. 6 illustrates an example ROC curve for identifying uncovered struts.

In examples where results were collected on 80 pullbacks, sensitivity was determined to be about 85±2% and specificity was about 85±3% for identifying uncovered struts before training data improvement. After training data improvement, sensitivity was improved to 94±3% and specificity was improved to 90±4% for the same test data. Statistics were calculated for uncovered struts, because stent studies usually report percentage of uncovered struts in a pullback. We used the probabilistic output of SVM to plot the receiver-operating characteristic (ROC) curve (FIG. 6). The area under the ROC is 0.92 before improving training data and 0.97 after.

Figure 7:
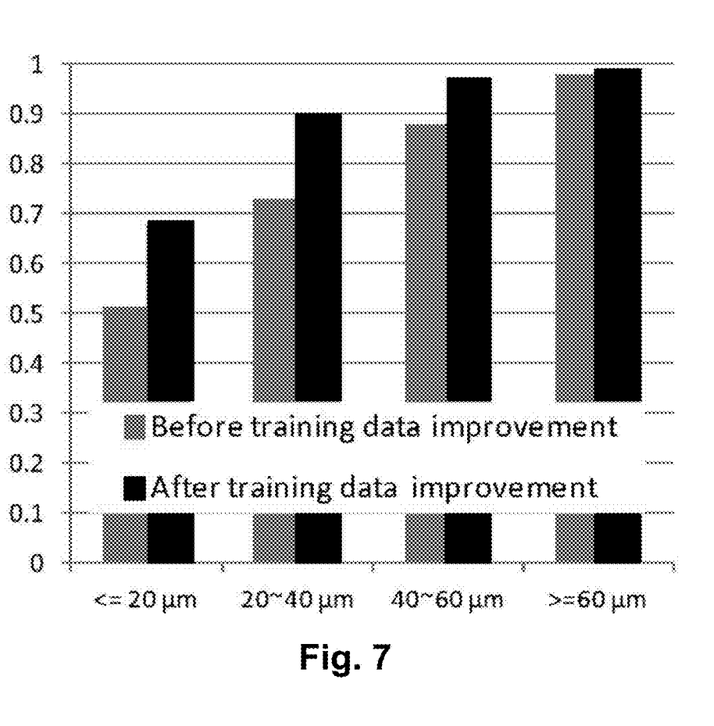
FIG. 7 illustrates an example of specificity for identifying uncovered struts increases as the coverage thickness of covered struts increases.

Performance for different levels of coverage thickness was also examined FIG. 7 shows that the specificity increases as the coverage thickness increases. With thickness greater than 40 μm, specificity approaches 90%. After training data improvement, specificity for struts with thinner tissue coverage was significantly improved. Note that the specificity on uncovered struts is equivalent to sensitivity on covered struts. True negatives of uncovered struts are covered struts correctly classified as covered (TP for covered struts). False positives of uncovered struts are covered struts misclassified as uncovered (FN for covered struts). Therefore, we have:

Specificity on uncovered struts =

$TN$ uncovered/($TN$ uncovered + $FP$ uncovered)

= $TP$ covered/($TP$ covered + $FN$ covered)

= Sensitivity on covered struts.

Figure 8A:
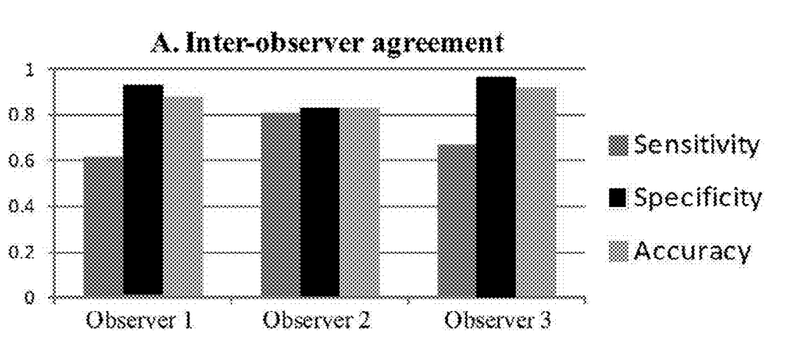
FIGS. 8A-C illustrate an examples of inter- and intra-observer agreement in which: 8A depicts a comparison of multiple observers' analyses to a Standard established by a consensus of two expert analysts; 8B depicts an example comparison of two observers' analyses to the same analyses done by the same observers at an earlier time point; and 8C depicts an example comparison of software performance to the Standard.
Figure 8B:
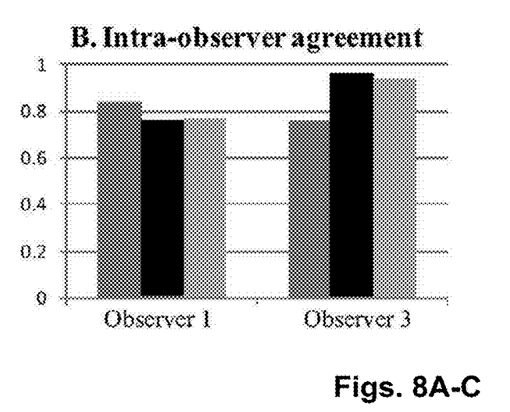
Figure 8C:
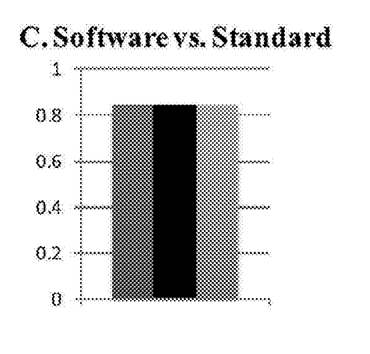

Image analysis performance evaluated on the Standard pullbacks may be compared to inter- and intra-observer agreement, as demonstrated in FIG. 8. For inter-observer variability analysis, Observers 1-3 have 80%-95% agreement with the Standard on covered struts and 60%-80% agreement on uncovered struts. Algorithm performance is similar to Observer 2. Observers 1 and 3 have lower sensitivity and higher specificity than the algorithm, which indicates that these two analysts marked more struts as covered comparing to the algorithm. By way of comparison, for intra-observer variability analysis, Observer 1 shows about 80% agreement with himself one year ago.

Observer 3 shows 95% agreement with himself one month ago on covered struts and 78% agreement on uncovered struts. The difference in intra-analyst agreement is reasonable considering the different time intervals of the repeated analyses. In general, algorithm performance is comparable to inter- and intra-observer agreement.

Strut Tissue Coverage Thickness/Distance to Lumen Measurement

Figure 9A:
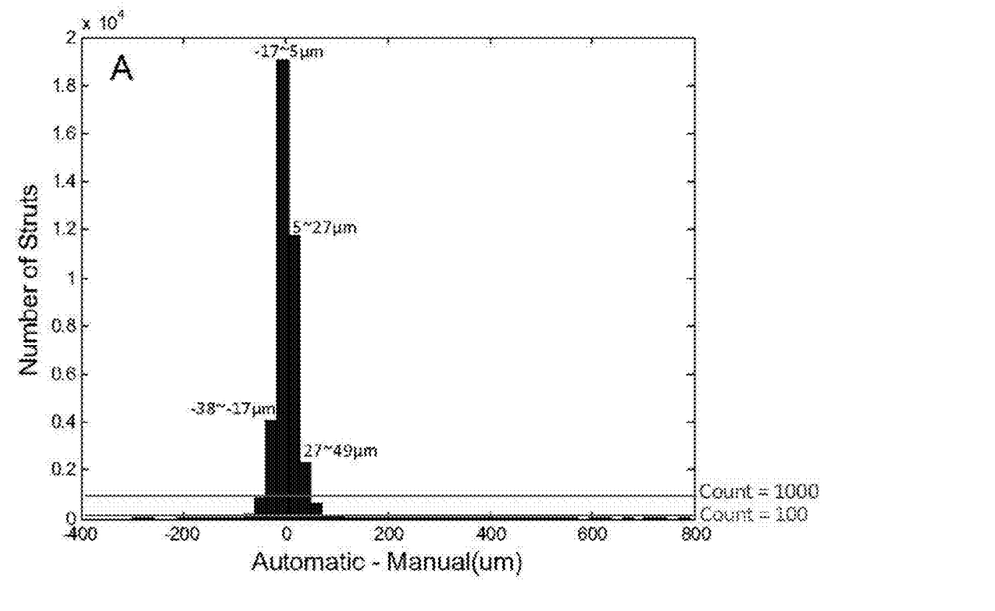
FIGS. 9A-B are a comparison of manual and automatic measurements of strut level tissue thickness in which 9A depicts an example of histogram of errors on a set of struts; and 9B depicts an example correlation between automatic and manual measurements after removing outliers.
Figure 9B:
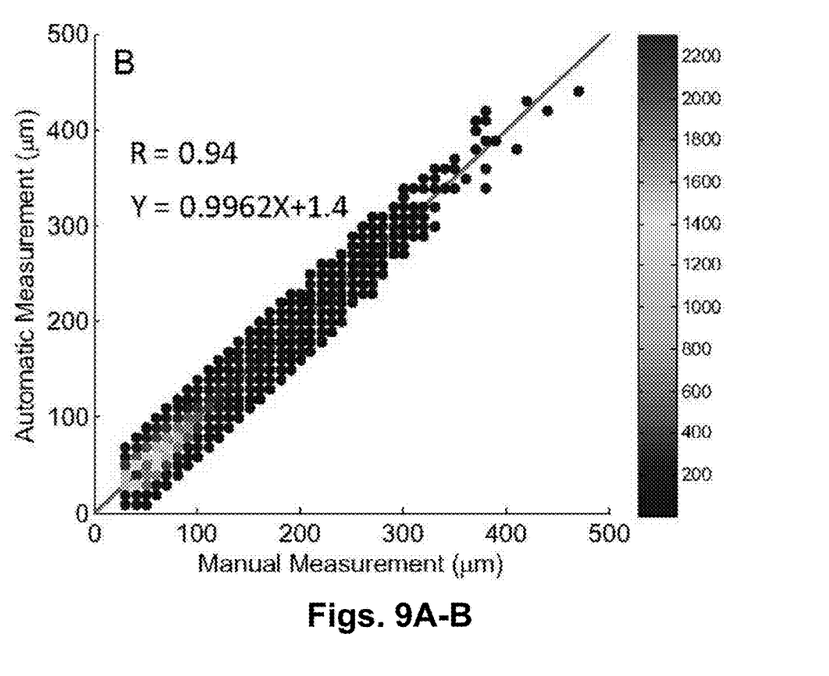

FIGS. 9A-B depict example plots comparing manual and automatic measurements of strut level tissue thickness, as obtained utilizing automated image analysis, as disclosed herein (see, FIGS. 1 and 2) and manual measurement using the commercial offline analysis tool. In FIG. 9A, a histogram of errors is demonstrated on 39,000 struts. The mean and standard deviation of the errors are 2.5 μm and 29 μm, respectively. More than 95% errors are smaller than 50 μm. After removing 5% of outliers due to lumen segmentation errors, the correlation coefficient between manual and automatic methods is 0.94 as demonstrated in FIG. 9B. For strut to lumen distance measurement, the error is 0.1±2.9 μm and correlation coefficient is 1.00. There is less error in distance measurement as it is not affected by lumen segmentation error. Very few large errors were caused by lumen segmentation errors in images with blood along the vessel wall. Very few large errors due to lumen segmentation errors can be avoided after manual correction of lumen contour.

Uncovered Strut Cluster Detection

Figure 10:
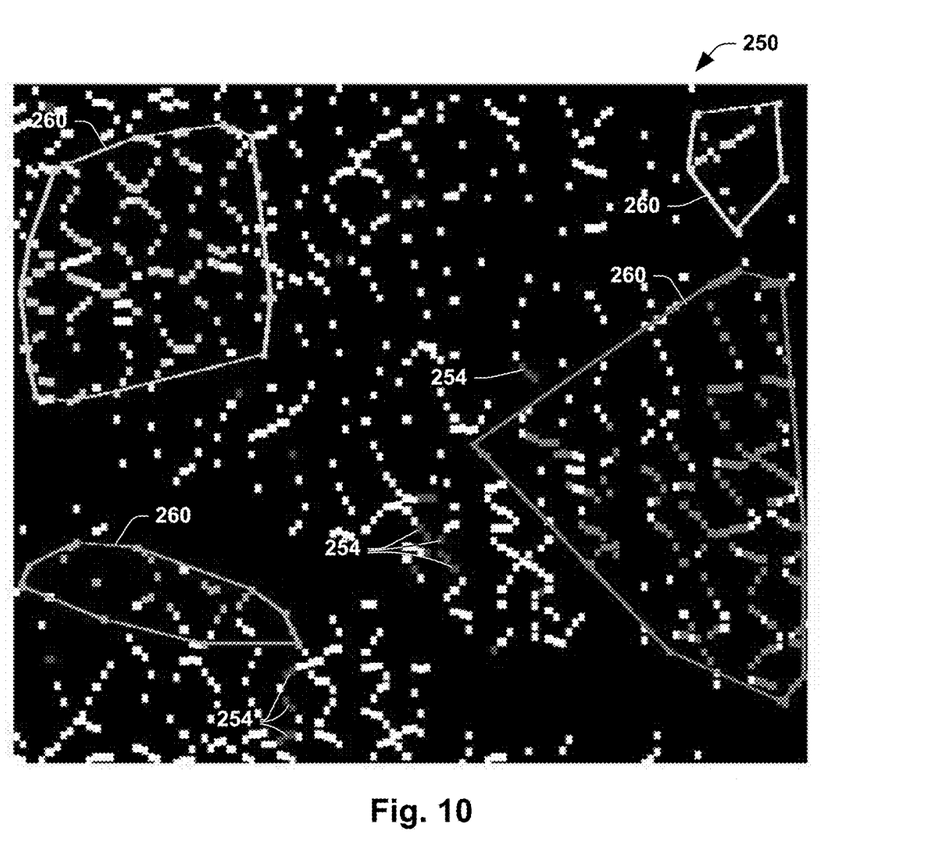
FIG. 10 illustrates uncovered strut cluster on the 2D surface of a stent mesh. Struts in white are covered and those in red are individual uncovered struts. Polygons in other colors enclose clusters of uncovered struts.

FIG. 10 illustrates uncovered strut clusters on a 2D surface of a stent mesh, demonstrated at 250, such as determined by (e.g., cluster detector 57) implementing Mesh Growing cluster detection disclosed herein. Covered struts are shown in white throughout the image 250, and clusters of uncovered struts may be represented in color, for example. Small clusters of uncovered struts are shown distributed about the image, such as at 254. A plurality of larger clusters of uncovered struts are shown contained within polygons at 260. In this example, large clusters 260 are defined as clusters with more than 15 uncovered struts. Another option would be setting a threshold of cluster area, which may be programmable in response to a user input (e.g., via user interface 44). Users of the cluster detection may determine this threshold based on future studies or user preferences. A convex hull was computed for each large cluster and drawn in the same color as the struts.

Figure 11A:
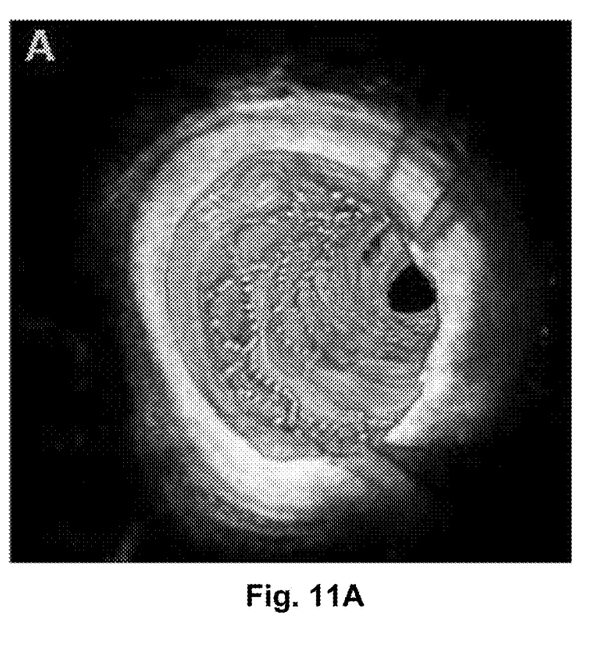
FIGS. 11A-B illustrate a 3D visualization of a stent in which: 11A depicts an example blood vessel wall being rendered; and 11B depicts an example in which the vessel wall is removed.
Figure 11B:
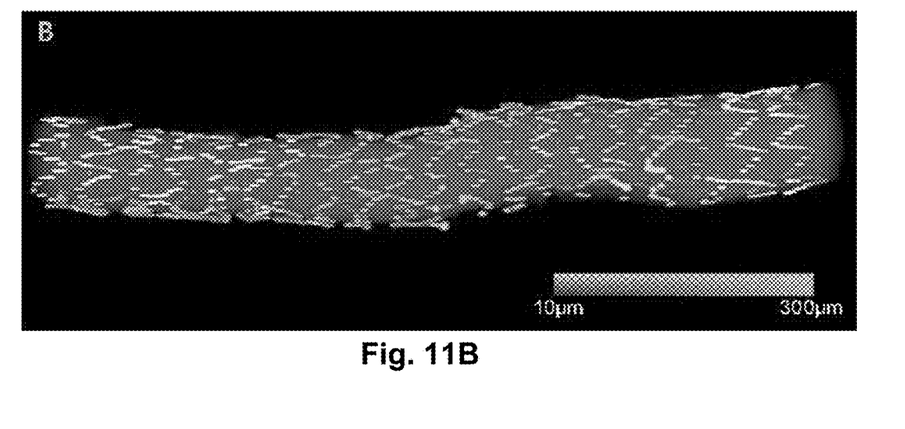

FIGS. 11A-B illustrate an example visualization of stent that is implanted in a distal right coronary artery (Dist RCA). In FIG. 11A, the blood vessel wall and stent are rendered in a three-dimensional visualization. In FIG. 11B, the vessel wall is removed and the stent structure is demonstrated. In the rendering of FIG. 11B (e.g., generated by output generator 58), each of the uncovered struts and struts can be color coded to differentiate between covered/uncovered. Additionally, a color scale may be utilized (e.g., by output generator 58) to visualize different ranges of coverage thickness.

In view of the foregoing, systems and methods are disclosed to provide comprehensive stent analysis in IVOCT image volumes. As disclosed herein, the systems and methods may employ a set of image features and SVM to classify automatically detected stent struts as covered or uncovered based on the image features. For covered struts, the systems and methods may automatically determine the strut tissue coverage thickness using a closest point algorithm. For uncovered struts, systems and methods detect clusters of uncovered struts using our Mesh Growing algorithm. The strut classification approach can afford sensitivity and specificity that is comparable to inter- and intra-observer agreement. In contrast, manual classification of thinly covered struts (e.g., below 30 μm) and uncovered struts is subjective and is the major source of inter- and intra-observer variability.

The proposed Mesh Growing algorithm combines the concepts of graph methods and region growing algorithm. In some examples, the neighborhood size is set arbitrarily. In other examples, parameters for setting neighborhood size can be set based on image features in the cardiology field or user preferences. For instance, the neighborhood size can be chosen based on the dimensions of the stent structure, i.e., one "period" of the repeated pattern on the stent. Systems and methods disclosed herein are expected to enable efficient cluster analysis in a large number of stent pullbacks, which will help determining whether "cluster of uncovered struts" could be a new, more powerful predictor of LST, as well as the critical size and percentage of coverage of the clusters.

Operating Environment

As can be appreciated by those skilled in the art, portions of the invention may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable non-transitory computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It can be understood that blocks of the illustrations, and combinations of blocks in the illustrations, can be implemented by computer-executable instructions. These computer-executable instructions may be provided to one or more processor cores of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
    storing, in non-transitory memory, three-dimensional image data acquired intravascularly via an optical coherence tomography (OCT) apparatus;
    detecting, by one or more processor, struts of a stent based on analysis of the image data;
    generating a plurality of pixel patches associated with and positioned adjacent to the detected struts based on the image data;
    determining a respective set of image features for the plurality of pixel patches associated with each detected strut based on the image data; and
    classifying, by the processor, each of the detected struts as one of covered or uncovered based on applying a trained classifier with respect to the respective set of image features.

2. The method of claim 1, wherein the classifying comprises using a Support Vector Machine classifier.

3. The method of claim 1, further comprising:
    calculating thickness of tissue coverage for each strut that is classified as covered; and calculating, for each strut that is classified as uncovered, a distance from each respective strut to an adjacent lumen boundary.

4. The method of claim 3, further comprising characterizing an apposition for each strut that is classified as uncovered based on the calculated distance and storing at least one measurement of tissue coverage thickness for each strut.

5. The method of claim 3, wherein calculating thickness further comprises calculating a distance from a center of each covered strut to a closest point on the lumen boundary and storing at least one measurement of tissue coverage thickness for each strut covered based on the calculated distance.

6. The method of claim 3, further comprising selecting one of a plurality of distance calculations based on geometry of at least one of a catheter or the lumen boundary, the selected distance calculation being used to provide the calculated thickness and/or the calculated distance.

7. The method of claim 6, wherein plurality of distance calculations comprise: a distance along the A-line between each strut and a catheter; and a distance along the A-line from the strut to lumen center.

8. The method of claim 1, wherein the determined image features comprise at least one of intensity values for pixels in each of the plurality of pixel patches or distance values among selected pairs of pixel patches.

9. The method of claim 1, wherein different features are computed for different ones of plurality of pixel patches associated with each detected strut.

10. The method of claim 1, further comprising detecting one or more clusters of uncovered struts.

11. The method of claim 10, wherein detecting the clusters of uncovered struts further comprises implementing a graph-based mesh growing method to detect the one or more clusters of uncovered struts.

12. The method of claim 11, wherein the graph-based mesh growing method comprises: starting a given cluster with a seed point of a detected uncovered strut; checking multiple neighborhoods in a plurality of directions from the seed point for any uncovered strut; and in each neighborhood, adding each uncovered strut that is detected to the given cluster.

13. One or more computer readable media having instructions that, when executed by one or more processors, perform the method of claim 1.

14. A system comprising:
an intravascular optical coherency tomography (IVOCT) apparatus that provides image data acquired during movement of an OCT probe within a body lumen;
one or more non-transitory media that stores the image data and image analysis instructions;
one or more processors to access the one or more non-transitory media and to execute the image analysis instructions, the image analysis instructions comprising:
a strut detector to detect struts of a stent within the body lumen based on the image data;
a feature extractor to generate a plurality of pixel patches associated with and positioned adjacent to the detected struts based on the image data, and to determine a respective set of image features for the plurality of pixel patches associated with each detected strut based on the image data; and
a strut classifier to classify each of the struts as one of covered or uncovered based on applying a trained classifier with respect to the respective set of image features for each of the detected struts.

15. The system of claim 14, further comprising:
a thickness measurement calculator to compute a measurement of thickness of tissue coverage for each strut that is classified as covered; and
a distance calculator to compute a distance from each respective strut that is classified as uncovered to an adjacent lumen boundary.

16. The system of claim 15, wherein the instructions further determine an apposition for each strut that is classified as uncovered based on the calculated distance.

17. The system of claim 14, further comprising a cluster detector to detect one or more clusters of uncovered struts according to a graph-based mesh growing method.

18. The system of claim 14, wherein the determined image features for each detected strut comprise at least one of intensity values for pixels in each of the plurality of pixel patches or distance values among selected pairs of pixel patches for each respective detected strut.

19. A method comprising:
storing in non-transitory memory, three-dimensional image data acquired intravascularly via an optical coherence tomography (OCT) apparatus;
detecting, by one or more processor, struts of a stent based on analysis of the image data;
extracting, by the processor, a set of image features for each of the detected struts based on the image data;
classifying, by the processor, each of the detected struts as one of covered or uncovered based on applying a trained classifier with respect to the extracted features; and
implementing a graph-based mesh growing method to detect the one or more clusters of uncovered struts, wherein the graph-based mesh growing method comprises:
starting a given cluster with a seed point of a detected uncovered strut; checking multiple neighborhoods in a plurality of directions from the seed point for any uncovered strut; in each neighborhood,
adding each uncovered strut that is detected to the given cluster; and
growing the cluster by adding an uncovered strut most distant to the seed point in one of the neighborhoods as a new seed point for the current cluster.

* * * * *